Patented Jan. 9, 1951

2,537,004

UNITED STATES PATENT OFFICE 2,537,004

CITRIC ACID SALTS AND THEIR PREPARATION

Samuel Breiter and Martin E. Hultquist, Bound Brook, N. J., assignors to American Cyanamid Company, New York, N. Y., a corporation of Maine No Drawing. Application May 1, 1948, Serial No. 24,675

10 Claims. (Cl. 260—268)

The present invention relates to new organic compounds and their preparation. More particularly, it relates to citric acid salts of substituted piperazines and their preparation. In a co-pending application "Piperazine Derivatives and Methods of Preparing Same," Serial Number 661,884, filed April 12, 1946, now Patent Number 2,467,895, new compounds having excellent therapeutic utility in the treatment of filariasis are described and claimed. The new compounds described therein have the following general formula:

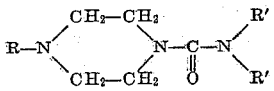

in which R is hydrogen or an alkyl radical and R' is an alkyl radical.

These compounds, in general, are oils or oil-like substances and are generally purified and used in the form of their acid salts which are crystalline or of a solid nature. Unfortunately, most of the salts that have been prepared have been found to be hygroscopic or of an amorphous nature and as such are difficult to incorporate and use in therapeutic preparations or in individual dosage units.

The hydrochloride salts of the above compounds tend to absorb moisture from the atmosphere, particularly under humid conditions. Because of their hygroscopic nature, they are difficult to handle in pharmaceutical manufacturing processes. The finished unit in the case of tablets, unless coated with a moisture resistant coating, absorb water from the atmosphere and become soft, misshapen and generally unfit for distribution. Often if any salts of this nature are mixed with other therapeutic agents, the absorbed moisture tends to result in the early decomposition of such mixtures.

In our search for a suitable physical form of the substituted piperazines described above, we discovered that most acid salts including the hydrochloride were hygroscopic, did not produce crystalline products or were otherwise unsuitable for pharmaceutical use. Salts such as the sulfate, phosphate, acetate, benzoate, salicylate, succinate, tartrate, malate, etc., were prepared but did not give crystalline products suitable for tableting or other pharmaceutical use. We discovered, however, that the dihydrogen citrate salt of the piperazines disclosed in the aforementioned application can be prepared and that such salts are not hygroscopic and have otherwise physical properties which make them useful in most therapeutic preparations which would be useful and desirable.

We have also discovered, surprisingly, that the dihydrogen citrate salts are more readily prepared from a commercial point of view, than other salts. For example, it is not necessary that the piperazine compound be pure in order to prepare the dihydrogen citrate salt. In fact a relatively impure piperazine can be used to prepare the dihydrogen citrate salt and still obtain a pure product in the form of its salt.

The citric acid salts of the present invention are prepared by merely reacting citric acid with the free base shown in the structural formula above. Although citric acid has three carbonyl groups, it has been found that the product of the reaction is a piperazine dihydrogen citrate salt. Accordingly, the piperazine dihydrogen citrate salt will contain approximately equally molecular proportions of the citric acid and the free base.

The reaction is preferably conducted in an organic solvent such as an alcohol in which citric acid and the free base are moderately soluble but the dihydrogen citrate salt is somewhat insoluble. Such solvents include methanol, ethanol, isopropanol, and other alcohols or mixtures thereof. Also, solvents such as toluene, benzene, and the like can be used in the above reaction. The salt formation will also take place in water, dioxane and the like but this is generally to be avoided because of the possibility of the formation of hydrates of the product.

The reaction in general will take place at room temperature or slightly above and on cooling the reaction mixture, the product will usually precipitate in crystalline form.

To illustrate a preferred embodiment of the invention the preparation of the free base has been included in Example 1 since the above compounds and their preparation has only recently been described in the literature.

Example 1

To 50 cc. of water is added 18 g. of 1-methylpiperazine dihydrochloride and 8.34 g. of sodium hydroxide. When solution is effected the beaker is cooled to 10° C. and with stirring, 4.17 g. of sodium hydroxide dissolved in 15 cc. of water and 14 g. of diethyl carbamyl chloride are added simultaneously. When addition is complete, the solution is extracted 3 times with ether which is then dried and filtered. The ether is removed by distillation and the 1-diethylcarbamyl-4-methylpiperazine is obtained as an oily solid.

A solution of 9.95 g. (0.5 mole) of 1-diethylcarbamyl-4-methylpiperazine in 100 cc. of acetone is prepared. To the above solution is added slowly a mixture of 9.6 g. (0.5 mole) of citric acid in 75 cc. of acetone. The precipitated product is filtered, washed with 25 cc. of acetone and dried at 50° C. for eight hours. A yield of 18.1 g. (92.6%) of 1-diethylcarbamyl-4-methylpiperazine dihydrogen citrate is obtained, having a melting point of 135.5°–137° C.

*Example 2*

A solution of 9.95 g. (.05 mole) of 1-diethylcarbamyl-4-methylpiperazine in 10 cc. of water is prepared. To this is added 10.5 g. of citric acid monohydrate. The mixture is heated until clear and then cooled at 25° C. and diluted with 200 cc. of acetone. The precipitated product is filtered and washed with 25 cc. of acetone. After drying for eight hours at 50° C., a yield of 9.2 g. (47%) of 1-diethylcarbamyl-4-methylpiperazine dihydrogen citrate is obtained.

*Example 3*

To 40 cc. of anhydrous methanol is added 9.95 g. (.05 mole) of 1-diethylcarbamyl-4-methylpiperazine and 10.5 g. of citric acid monohydrate. The mixture is heated until complete solution takes place and then cooled to 10° C. The precipitated product is filtered and washed with 10 cc. of cold methanol. On drying at 50° C. for eight hours, a yield of 11.5 g. (59%) of the dihydrogen citrate salt is obtained.

*Example 4*

To 75 cc. of anhydrous ethanol is added 9.95 g. (.05 mole) of 1-diethylcarbamyl-4-methylpiperazine. To this mixture is slowly added a solution of 10.5 g. of citric acid monohydrate in 75 cc. of ethanol. The mixture is cooled to 10° C. and after stirring one half hour, is filtered. The product is washed with 25 cc. of cold ethanol and dried for eight hours at 50° C. A yield of 16.3 g. (83%) of the dihydrogen citrate salt is obtained.

*Example 5*

To a mixture of 40 cc. of anhydrous isopropyl alcohol and 9.95 g. of 1-diethylcarbamyl-4-methylpiperazine is added a solution of 10.5 g. of citric acid monohydrate in 150 cc. of isopropyl alcohol. The solution is cooled to 15° C. and filtered. The precipitate is washed with 40 cc. of cold isopropyl alcohol and dried for eight hours at 50° C. A yield of 15.5 g. (79%) of 1-diethylcarbamyl-4-methylpiperazine dihydrogen citrate is obtained.

*Example 6*

9.95 g. of 1-diethylcarbamyl-4-methylpiperazine is dissolved in 40 cc. of isopropyl acetate. A solution of 10.5 g. of citric acid monohydrate in 150 cc. of isopropyl acetate is added. The mixture is cooled to 15° C., filtered and washed with 50 cc. of cold isopropyl acetate. After drying eight hours at 50° C., a yield of 17.7 (90%) of the dihydrogen citrate salt is obtained.

*Example 7*

To 40 cc. of dioxane is added 9.95 g. of 1-diethylcarbamyl-4-methylpiperazine. To this mixture is then added a solution of 10.5 g. of citric acid monohydrate in 75 cc. of dioxane. The mixture is cooled to 15° C. and filtered. The precipitate is washed with 40 cc. of cold dioxane and dried eight hours at 50° C. Yield 16.1 g. (82%) of 1-diethylcarbamyl-4-methylpiperazine dihydrogen citrate.

*Example 8*

To 9.95 g. of 1-diethylcarbamyl-4-methylpiperazine in 60 cc. of toluene is added a solution of 10.5 g. of citric acid monohydrate in 25 cc. of acetone. A gummy precipitate is first obtained which on rubbing with a rod, yields a crystalline material. The product is filtered, washed with 50 cc. of acetone and dried at 50° C. for eight hours. A yield of 19.6 g. (100%) of 1-diethylcarbamyl-4-methylpiperazine dihydrogen citrate is obtained.

The procedure described in the above examples can be used in preparing the citrate salts of other piperazines disclosed in the aforementioned application, Serial Number 661,884, filed April 12, 1946, now Patent Number 2,467,895.

We claim:

1. Dihydrogen citrate salts of compounds having the formula:

$$R-N\begin{matrix}CH_2-CH_2\\CH_2-CH_2\end{matrix}N-\underset{\underset{O}{\|}}{C}-N\begin{matrix}R'\\R'\end{matrix}$$

in which R is a member of the group consisting of hydrogen and alkyl radicals and R' is an alkyl radical.

2. Dihydrogen citrate salts of compounds having the formula:

$$R-N\begin{matrix}CH_2-CH_2\\CH_2-CH_2\end{matrix}N-\underset{\underset{O}{\|}}{C}-N\begin{matrix}R'\\R'\end{matrix}$$

in which R and R' are alkyl radicals.

3. 1-dimethylcarbamyl-4-methylpiperazine dihydrogen citrate.

4. 1-diethylcarbamyl-4-methylpiperazine dihydrogen citrate.

5. 1 - diethylcarbamylpiperazine dihydrogen citrate.

6. A process which comprises mixing together in an inert organic solvent under reactive conditions citric acid and a compound having the formula:

$$R-N\begin{matrix}CH_2-CH_2\\CH_2-CH_2\end{matrix}N-\underset{\underset{O}{\|}}{C}-N\begin{matrix}R'\\R'\end{matrix}$$

in which R is a member of the group consisting of hydrogen and alkyl radicals and R' is an alkyl radical, and recovering therefrom the dihydrogen citrate salt of the latter.

7. A process which comprises mixing together in an inert organic solvent under reactive conditions citric acid and the compound having the formula:

$$R-N\begin{matrix}CH_2-CH_2\\CH_2-CH_2\end{matrix}N-\underset{\underset{O}{\|}}{C}-N\begin{matrix}R'\\R'\end{matrix}$$

in which R and R' are alkyl radicals, and recovering therefrom the dihydrogen citrate salt of the latter.

8. A method which comprises mixing together in an inert organic solvent under reactive conditions citric acid and 1-diethylcarbamyl-4-methylpiperazine and recovering therefrom the dihydrogen citrate salt of the latter.

9. A method which comprises mixing together in an inert organic solvent under reactive conditions citric acid and 1-dimethylcarbamyl-4-methylpiperazine and recovering therefrom the dihydrogen citrate salt of the latter.

10. A method which comprises mixing together in an inert organic solvent under reactive conditions citric acid and 1-diethylcarbamylpiperazine and recovering therefrom the dihydrogen citrate salt of the latter.

SAMUEL BREITER.
MARTIN E. HULTQUIST.

REFERENCES CITED

The following references are of record in the file of this patent:

UNITED STATES PATENTS

| Number | Name | Date |
|---|---|---|
| 597,454 | Bishop | Jan. 18, 1898 |